March 18, 1969
J. F. CLEARMAN ET AL
3,433,363
DISH HOLDING RACK
Filed Jan. 12, 1967
Sheet 1 of 2
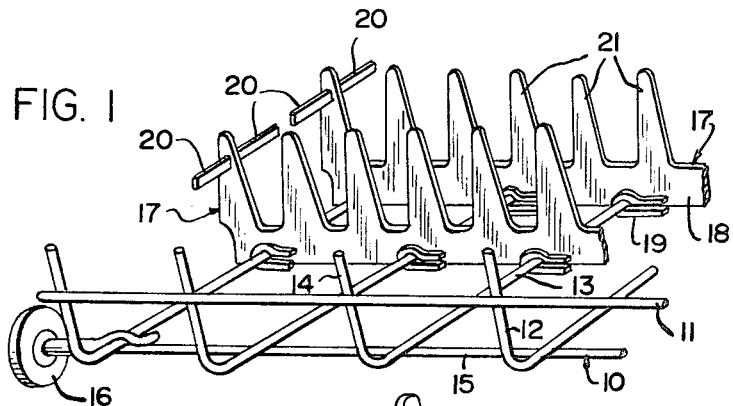
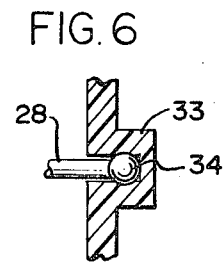
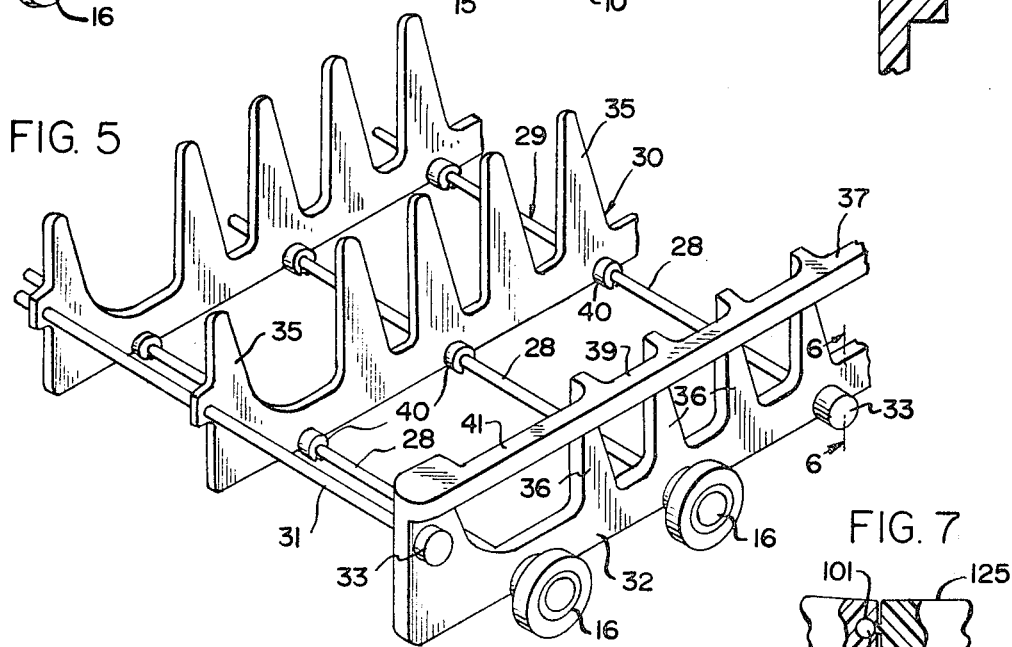
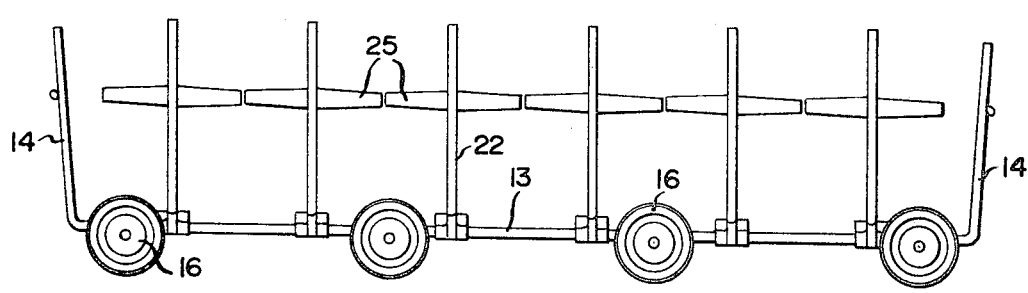
INVENTORS
JACK F. CLEARMAN
WALTER C. BARNARD
BY Hofgren, Wegner, Allen,
Stellman & McCord
ATTORNEYS.

United States Patent Office 3,433,363
Patented Mar. 18, 1969

3,433,363
DISH HOLDING RACK
Jack F. Clearman and Walter C. Barnard, White Bear Lake, Minn., assignors to Whirlpool Corporation, a Corporation of Delaware
Filed Jan. 12, 1967, Ser. No. 608,827
U.S. Cl. 211—41    7 Claims
Int. Cl. A47g 19/08

ABSTRACT OF THE DISCLOSURE

A dish holding rack having a bottom made of spaced wire members and transverse inserts attachable to the wire members to divide the rack into sections with the inserts having spaced dish supporting prongs.

---

In automatic dishwashers one or more open racks are provided so that the dishes may be held in spaced apart relationship in order that washing liquid and rinsing liquid can be projected onto the exposed dish surfaces for cleaning these surfaces. The term "dish" used herein, of course, includes glassware, pans and similar utensils in addition to ordinary dishes.

One of the features of this invention is to provide an improved dish holding rack of the above type which is inexpensive, strong and which uses interfitted parts including a plurality of spaced transverse inserts each carrying dish retaining means with the result that flexibility of design permits producing different types of racks with the same types of parts.

Other features and advantages of the invention will be apparent from the following description of certain embodiments of the invention as illustrated in the accompanying drawings. Of the drawings:

FIGURE 1 is a fragmentary perspective view of a portion of a dish holding rack embodying the invention.

FIGURE 3 is a side elevational view partially in section of the embodiment of FIGURE 2.

FIGURE 5 is a fragmentary perspective view of a third embodiment of the invention.

FIGURE 6 is a fragmentary sectional view taken substantially along line 6—6 of FIGURE 5.

FIGURE 7 is a fragmentary elevational view partially in section illustrating connecting means in another embodiment of the invention.

Figure 2:
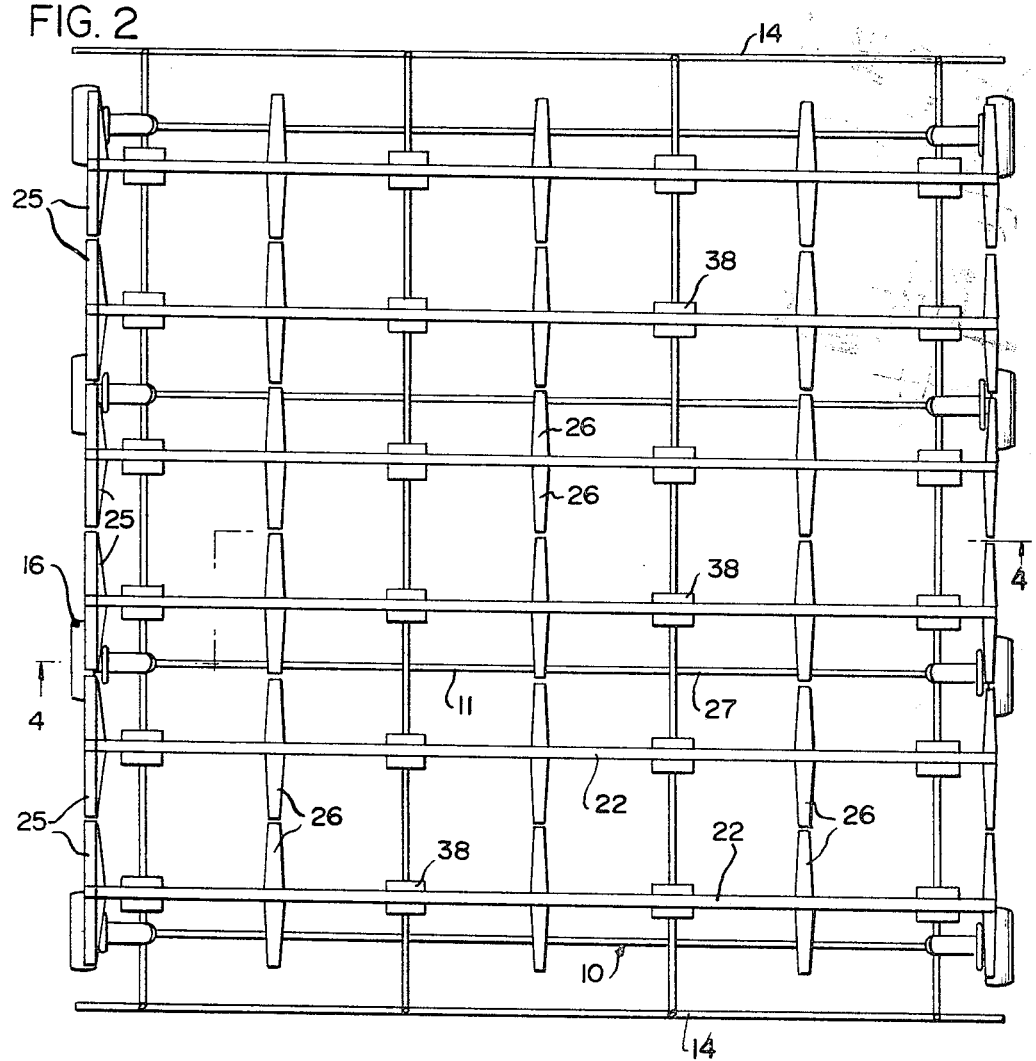
FIGURE 2 is a bottom elevational view of a second embodiment of the invention.

In the embodiment of FIGURES 1 and 2–4 the dish holding rack comprises a wire grid 10 of the customary type made up of sets of parallel wires 11 and 12 arranged transversely to each other and joined to each other as by welding. The grid 10 is turned up at the ends to form a wire mesh rack bottom 13 and a pair of opposite side members 14, as shown most clearly in FIGURE 3. Certain of the wires 15 of the grid 10 extend beyond the bottom 13 of the rack and carry snap-on plastic wheels 16 of the type which are the subject of U.S. Patent 3,261,647 assigned to the same assignee as the present application.

In the embodiment of FIGURE 1 there are provided a plurality of spaced transverse inserts 17, preferably made of a rigid plastic, with each having a bottom continuous portion 18 that carries clips 19 for releasably attaching the inserts 17 to the bottom cross wires that comprise the bottom 13 of the rack. In addition, each insert 17 carries laterally extending projections 20 that cooperate as by being linearly aligned to aid in retaining dishes within the rack. As can be seen in the embodiment of FIGURE 1, these projections 20 are elevated above the bottom 13 of the rack and together comprise side retaining members to prevent the dishes accidentally rolling off the rack. In addition, the inserts 17 are provided with spaced, projecting, dish supporting prongs 21 which function to retain the dishes in the rack in the above described spaced projections so as to permit contact of cleaning liquid with the dish surfaces.

Figure 4:
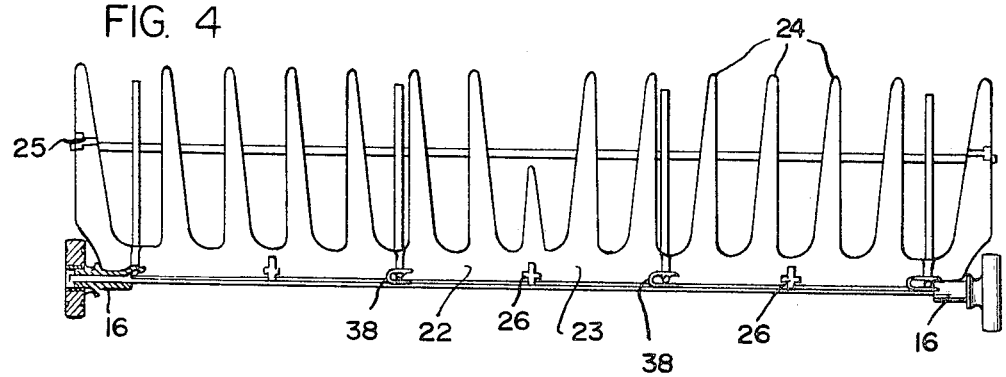
FIGURE 4 is a vertical sectional view taken substantially along line 4—4 of FIGURE 2.

In the embodiment of FIGURES 2–4 a similar wire grid 10 is used as indicated above to comprise the bottom 13 and sides 14 of the dish rack. The rack here has similar supporting wheels 16, as described above, and utilizes spaced dish retaining inserts 22. Each insert, as shown in FIGURE 4, is provided with a continuous bottom portion 23 and spaced upwardly projecting dish supporting prongs 24. In addition, each insert 22 carries adjacent its bottom retaining clips 38 similar to the clips 19 of the embodiment of FIGURE 1. Each insert 22 also carries at its ends laterally extending projections 25 similar to the projections 20 of FIGURE 1 which are also aligned and located above the bottom 13 of the rack in order to comprise side supporting portions of the rack.

If desired, the adjacent ends of the projections and especially the side projections 25 may be releasably interconnected. One means of providing such an interconnection is illustrated in FIGURE 7. Here the adjacent end of one prong 125 is provided with a socket 101 while the adjacent end of the next prong 125 is provided with a ball 100 releasably received in the socket 101. Thus, in this arrangement the side prongs 125 being releasably joined reinforce each other and provide a considerably stronger structure.

Each insert of this embodiment also includes additional sets of laterally extending projections 26 arranged in aligned sets as shown most clearly in FIGURE 2 to cooperate with the wires 11 to comprise the bottom 27 of the dish holding rack of this invention.

In the embodiment of FIGURES 5 and 6 there is also used spaced supporting wires 28 comprising the bottom 29 of the rack of this embodiment and spaced inserts 30 supported on the wires 28. In this embodiment side wires 31 are elevated above the bottom of the rack to constitute side supports functioning in a manner similar to the side projections 20 of FIGURE 1 and the side projections 25 of the embodiment of FIGURES 2–4.

In the embodiment of FIGURES 5 and 6 there are provided a spaced pair of end rack members 32 of which only one is shown for illustrative purposes in FIGURE 5. Each end rack member 32 is provided with means including sockets 33 for retaining the ends of certain of the longitudinal wires 28. These wires are provided with enlarged ball shaped ends 34 received in the sockets 33. Others of the wires 28 extend beyond the rack members 32 and carry the supporting wheels 16 which are similar to the wheels in the other embodiments.

The intermediate inserts 30 are provided with spaced upwardly projecting prongs 35 in order to aid in retaining dishes in the rack in spaced apart relationship. In addition, the bottoms of the inserts 30 have Snap-on fastening members 40 for attaching the inserts 30 to the spaced parallel wires 28 at the bottom of the rack.

The end rack members 32 have similar spaced upwardly projecting prongs 36 and the prongs on each rack member 32 are joined at their tops by an end member 37 integral with the prongs. Each end member 37 is recessed at its inner side portions as shown at 39 and 41 between adjacent prongs 36 to provide additional dish supporting means that retard sideways movement of the dishes retained within the rack.

The completed dish holding rack of this invention preferably has all metal surfaces covered with a resilient film such as a plastisol.

Having described our invention as related to the embodiments shown in the accompanying drawings, it is our The embodiments of the invention in which an exclusive property or privilege is claimed are defined as follows:

1. A dish holding rack, comprising: spaced wire members comprising a bottom of said rack; a plurality of spaced transverse inserts each having a continuous portion with projecting, spaced, dish supporting prongs; and releasable fastening means on said inserts for releasably attaching said inserts to said wire members.

2. A dish holding rack, comprising: spaced wire members comprising a bottom of said rack; a plurality of spaced, transverse inserts each having a continuous portion with projecting, spaced, dish supporting prongs; and fastening means on said inserts for attaching said inserts to said wire members, said wire members comprising a wire grid turned up at the ends to form a bottom member and a pair of opposite side members of the rack, and laterally extending projections on each of said inserts cooperating to form bottom dish supports and side dish retention members for said rack, said dish supporting projections being in aligned sets with the projections of each set cooperating to form a retaining wall of the rack.

3. The rack of claim 2 wherein certain of said projections are located at the bottom of said inserts to provide said bottom supports and others are located at the ends of said inserts and above said bottom to comprise said side retention members.

4. A dish holding rack, comprising: a spaced pair of end rack members; means including socket means on said end pair for retaining transverse, spaced wires; a plurality of said wires having ends received in said socket means; and means for attaching a plurality of inserts between said end pair to said wires, certain of said wires being located at the bottom of said rack and others at the sides and said rack members and inserts having spaced, upwardly extending, dish supporting prongs.

5. The rack of claim 4 wherein said end rack members are each provided with an integral end member adjacent the top of its prong with each being recessed at its inner side portions between adjacent prongs to provide dish support means.

6. A dish holding rack, comprising: spaced wire members comprising a bottom of said rack; a plurality of spaced, transverse inserts each having a continuous portion with projecting, spaced, dish supporting prongs; fastening means on said inserts for attaching said inserts to said wire members, at least some of the prongs on one insert having portions adjacent prong portions on another insert; and means on said adjacent prong portions interconnecting said prongs of said one insert with said adjacent prong portions.

7. The rack of claim 6 wherein said interconnecting means comprises a releasable projection-and-socket joint.

References Cited

UNITED STATES PATENTS

| | | | |
|---|---|---|---|
| 1,484,291 | 2/1924 | Blakeslee | 211—41 |
| 3,217,890 | 11/1965 | Maslow | 211—41 |

ROY D. FRAZIER, *Primary Examiner.*

F. DOMOTOR, *Assistant Examiner.*

U.S. Cl. X.R.

220—22